Jan. 17, 1933.　　G. W. ESCHENBACH　　1,894,512
APPARATUS FOR DISPLAYING ADVERTISING
Filed May 16, 1931　　3 Sheets-Sheet 1
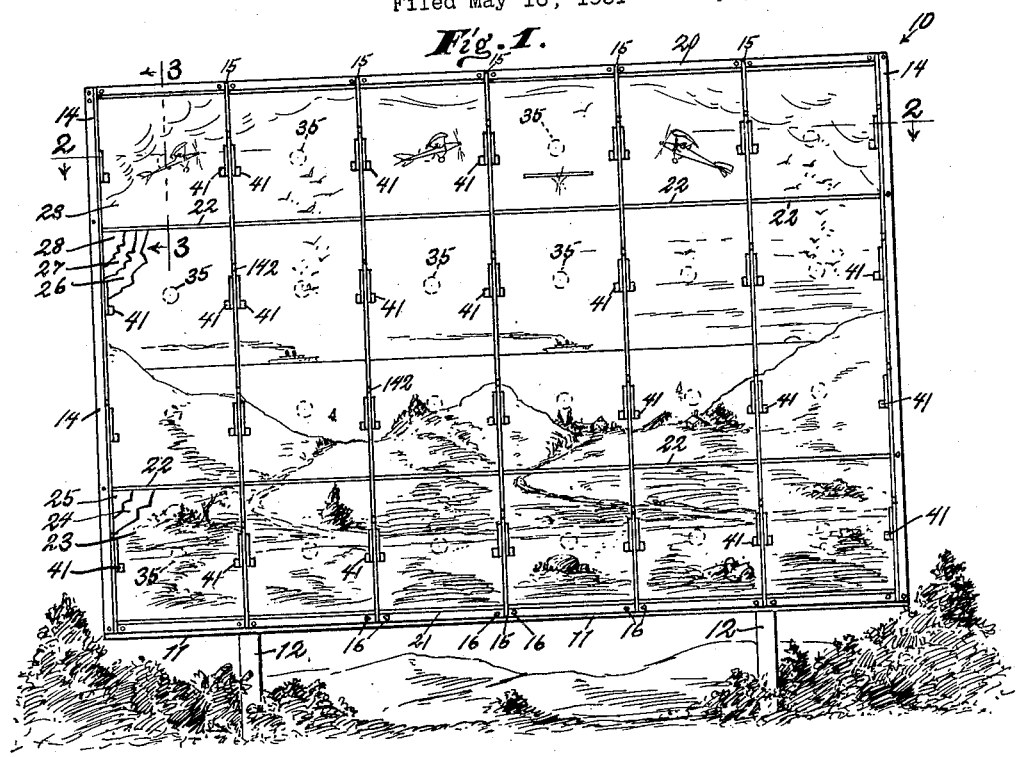
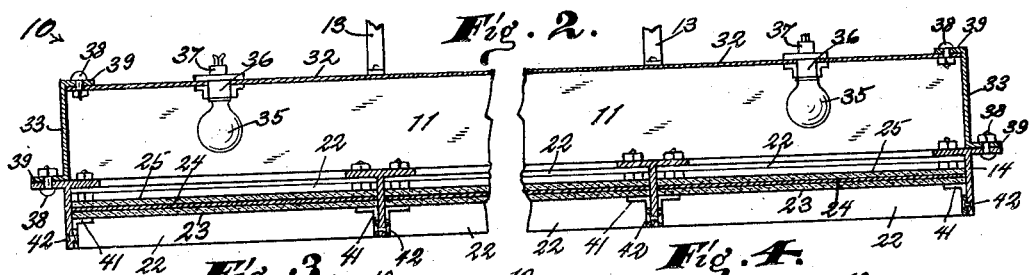
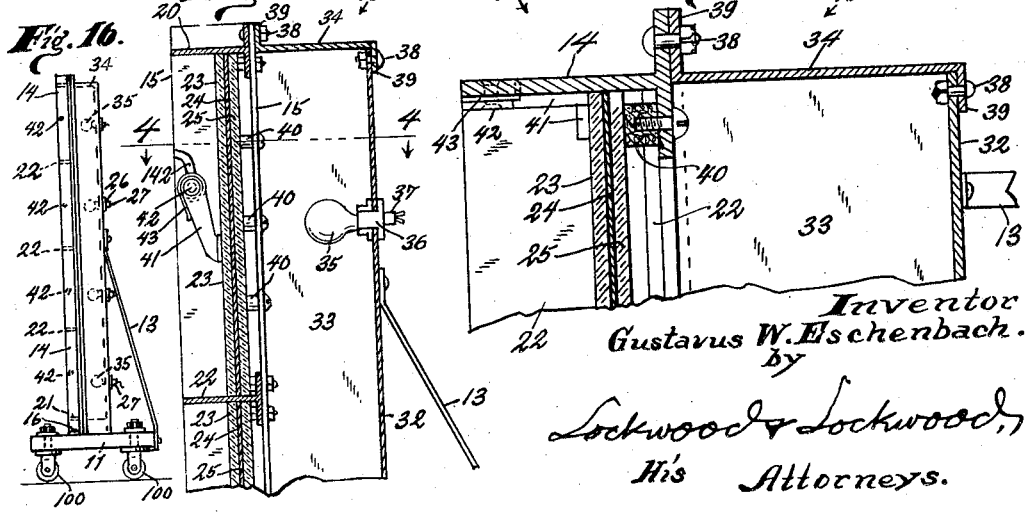
Inventor
Gustavus W. Eschenbach.
by
Lockwood & Lockwood,
His Attorneys.

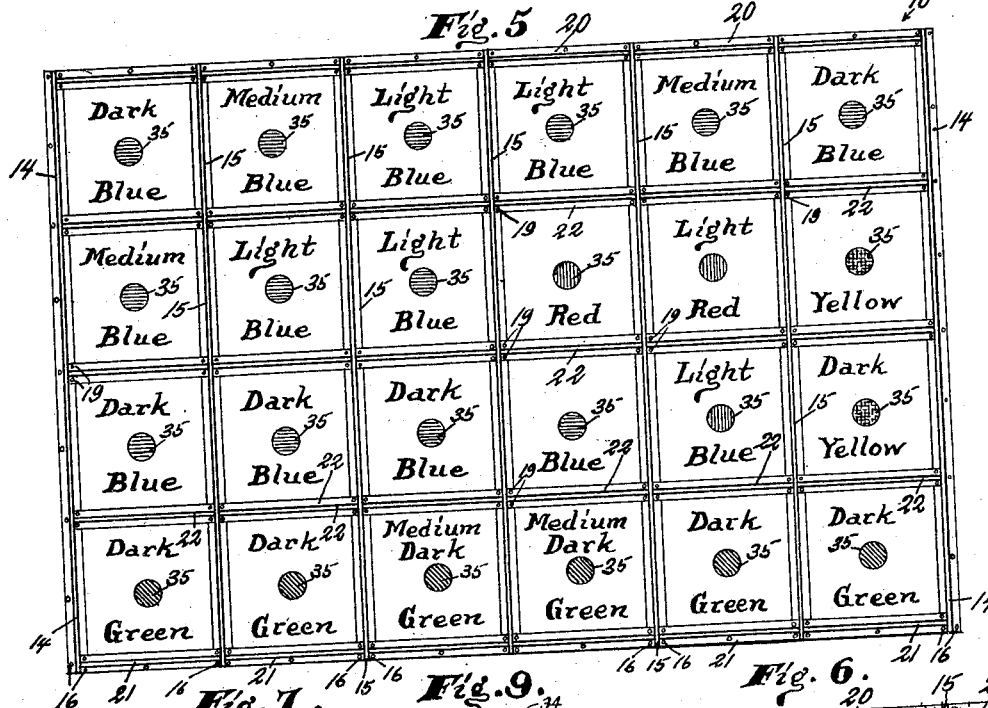

Jan. 17, 1933.   G. W. ESCHENBACH   1,894,512
APPARATUS FOR DISPLAYING ADVERTISING
Filed May 16, 1931   3 Sheets-Sheet 3
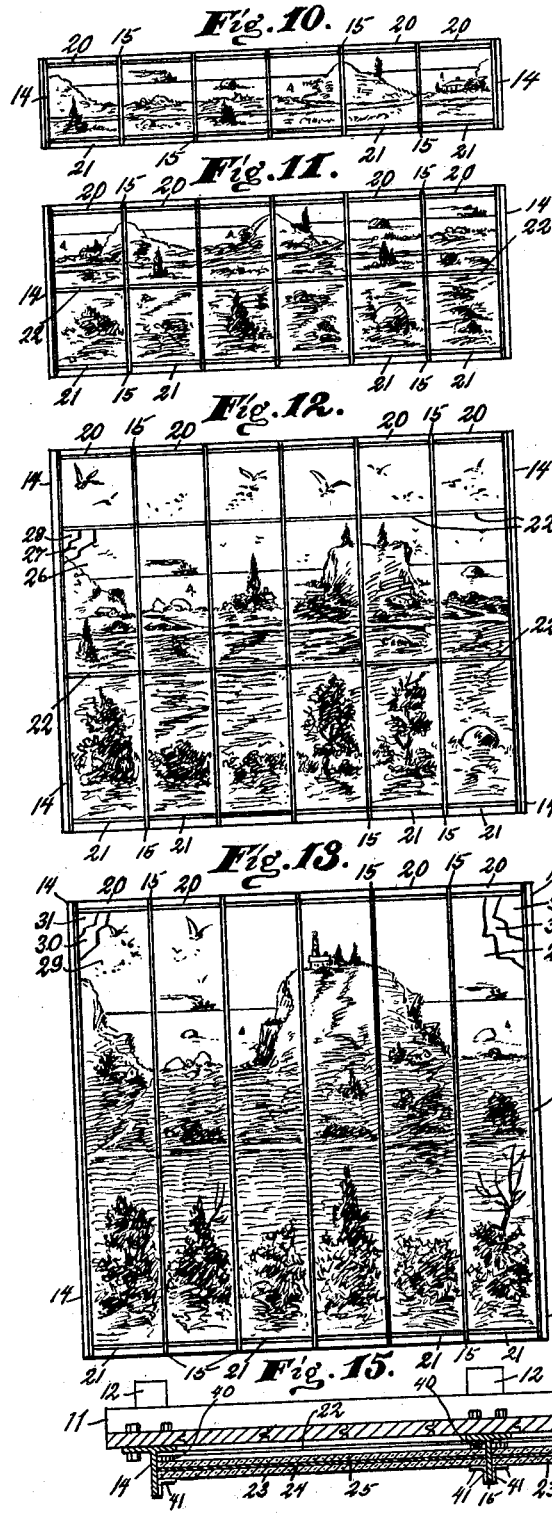
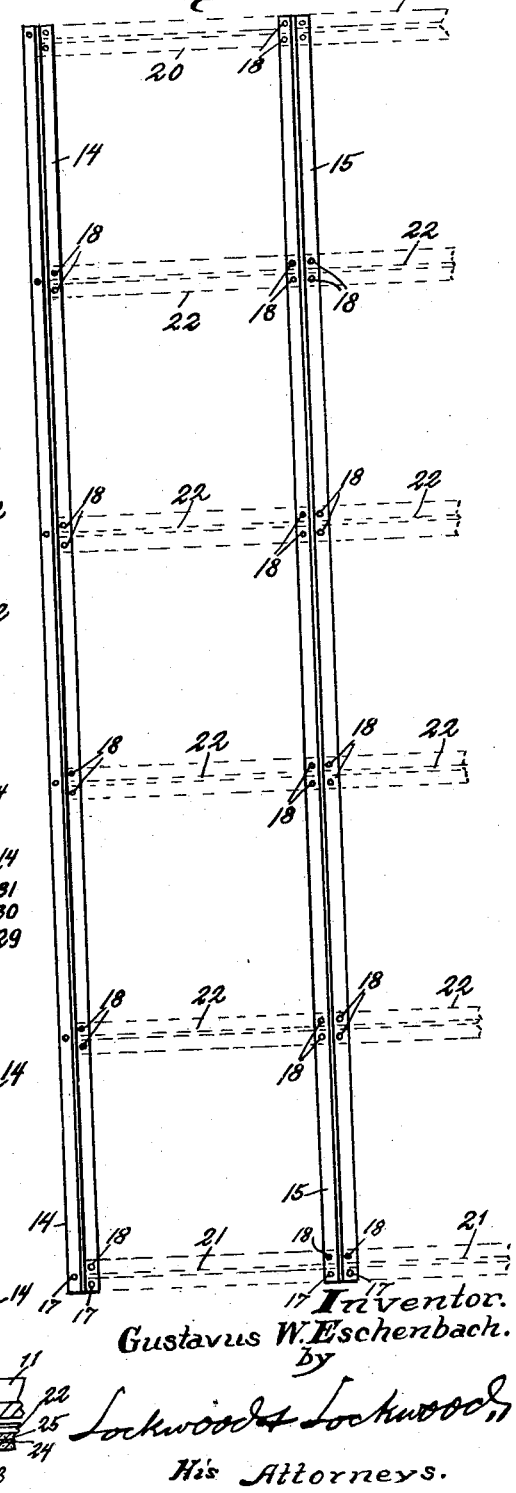
Inventor.
Gustavus W. Eschenbach.
by
Lockwood & Lockwood
His Attorneys.

Patented Jan. 17, 1933

1,894,512

UNITED STATES PATENT OFFICE

GUSTAVUS W. ESCHENBACH, OF LOS ANGELES, CALIFORNIA

APPARATUS FOR DISPLAYING ADVERTISING

Application filed May 16, 1931. Serial No. 537,903.

This invention relates to an apparatus for displaying pictorial advertising such as is usually shown on billboards and the like and the principal object is to provide an apparatus having pictorial features that are interchangeable from time to time to make new panoramic scenes that will pleasingly hold the attention of observers to the advertising, with the latter adapted to be presented either in the old or new way, thereby increasing the interest of the observers to the advertising.

Heretofore such bill-board advertising has been presented in a single picture with advertising that remains unchanged for the entire period on which it is on display, which time is usually weeks or months, during which period the observers not only lose interest in the display but it also becomes irritatingly tiresome to them; and one of the objects of this invention is to present billboard advertising so it will hold the interest of the observers and be continuously pleasing to them. To that end I provide a bill-board having a plurality of compartments in its face into which I place advertising and picture plates that are interchangeable to form a great variety of interesting and pleasing panoramic views, with the picture and advertising plates constructed so they can be changed from time to time or daily if desired to show an entirely new view and advertising subject-matter that will hold the attention of the observers and be pleasing, and not tiresome, to them.

Another object is to provide an apparatus for pictorial advertising with means for displaying the advertising in serials daily, weekly or monthly, which is accomplished by the use of the removable advertising features. By means of these plates arranged in sets for a serial I can start an advertising story of a commercial product in one locality and after a sufficient display, which may include an interchange of the pictorial plates to show a number of panoramic views, remove the first set of plates to another locality and replace them with the plates of the second series, thus progressing the advertising story from locality to locality until I have covered the entire territory in which the product needs advertising. It is obvious that an indefinite number of serial advertisings can be economically and effectively displayed on the same bill-board by use of my interchangeable and changeable plates, singly or in series, as may be desired.

A feature of the invention is shown in the construction, combination and arrangement of the parts of the bill-board whereby the compartments therein can be changed from square to rectangular spaces to receive either square or rectangular plates, or both, as may be desired.

Another feature of invention is shown in the means for removably holding and arranging the plates in the compartments, also for illustrating them with varied colored lights to make the pictorial advertising more visible and pleasing.

Other objects, advantages and features of invention may appear from the accompanying drawings, the subjoined detailed description and the appended claims.

The accompanying drawings illustrate the invention in which:

Figure 1 is a front view of an apparatus constructed in accordance with this invention, showing a bill-board having a plurality of compartments in its face filled with square and rectangular plates, each carrying part of a panoramic scene over which advertising can be displayed, the advertising being omitted for the sake of clearness in the drawings.

Fig. 2 is an enlarged fragmental horizontal section on line 2—2, Fig. 1, showing the detailed construction of the apparatus, also showing the means for mounting the plates in their compartments and illuminating them.

Fig. 3 is an enlarged fragmental vertical section on line 3—3, Fig. 1, showing a side view of the spring pressed arm for holding the plates in their respective compartments, also showing three of the rubber stops arranged to engage the vertical side edges of each of the back plates.

Fig. 4 is an enlarged fragmental cross section on line 4—4, Fig. 3, cutting through one of the rubber stops against which the back plates are pressed.

Fig. 5 is a semi-diagrammatic front view of the bill-board with the advertising and pictorial plates removed to show the arrangement of the colored lamps for illuminating the panoramic view shown in Fig. 1.

Fig. 6 is an enlarged fragmental front view of the upper left-hand corner of the bill-board showing the first picture of an advertising serial and subject-matter.

Fig. 7 is a front view of the second picture of the advertising serial ready to take the place of No. 1 plate when it is removed from the bill-board.

Fig. 8 is the third number of the advertising serial.

Fig. 9 is a side view of the apparatus with its top wind brace broken away.

Fig. 10 is a semi-diagrammatic view of the apparatus provided with a single row of square pictorial advertising plates interchangeable to form many panoramic views with the advertising matter omitted for the sake of clearness in the drawing.

Fig. 11 is a view analogous to Fig. 10 showing a double row of square pictorial advertising plates interchangeable horizontally to form a number of panoramic pictures.

Fig. 12 is another front view of the apparatus provided with both square and rectangular picture plates interchangeable horizontally to form panoramic scenes.

Fig. 13 is another front view of the apparatus provided with a single row of elongated rectangular picture plates interchangeable to form a number of panoramic views.

Fig. 14 is a skeleton front view of a portion of the frame showing the vertical T-irons by full lines and the horizontal T-irons by dotted lines. The vertical irons are extended so as to form five horizontal rows of square compartments instead of four, as shown in Figs. 1 and 5.

Fig. 15 is a horizontal fragmental section illustrating how the apparatus can be connected to the frame of an ordinary bill-board.

Fig. 16 is a semi-diagrammatic edge view of the bill-board mounted on caster wheels so it can be moved from place to place or turned to various positions to display the advertising on its front side.

The apparatus includes a frame 10 erected either on a base 11 that is supported on the usual posts 12 and wind braces 13, the latter being shown fragmentally in Figs. 2, 3 and 4, or on caster wheels 100 shown in Fig. 16.

The frame includes end and intermediate T-irons 14 and 15 spaced an equal distance apart and secured at their bottom ends to the base 11 by bolts 16 that are extended through holes 17 so that the irons are supported in a vertical position.

These T-irons are provided with spaced pairs of bolt holes 18 to receive bolts 19 by which the top, bottom and intermediate rows of horizontal T-irons 20, 21 and 22 are secured to the flanges of the vertical T-irons to form square compartments between them into which the squared superposed plates 23, 24 and 25 in groups of three are detachably fitted.

The pairs of bolt holes 18 are spaced an equal distance apart so that one or more of the intermediate row or rows of horizontal angle irons 22 can be removed from the frame to form rectangular compartments for the rectangular plates 26 that are associated with the intermediate plates 27 and back plates 28 arranged together in groups of three in their respective compartments, as indicated in Figs. 1 and 12. Also if desired all of the rows of intermediate T-irons 22 can be removed to form spaces for the elongated rectangular plates 29 that are associated with the intermediate plates 30 and back plates 31 in groups of three, as indicated in Fig. 13.

By removing one or more of the T-irons 22 rectangular spaces can be formed to receive the plates 26 or 29 which can be used separately or in combination with the square plates 23 for displaying the pictorial advertising, and these different sized plates can be arranged in many pleasing artistic forms.

The apparatus is provided with a back and side walls 32, 33 and a cover or roof 34 that form an enclosure for the lamps 35 that have insulating sockets 36 connected to the back wall 32 into which plugs 37 can be extended to light the lamps when necessary. The lamps and their connections are old in the art and for that reason are shown in the drawings semidiagrammatically.

The roof, back and side walls can be secured together and to the frame 10 in any well known way, as by bolts 38 and flanges 39, as best shown in Figs. 2, 3, 4 and 9.

The group of plates 23, 24, 25; 26, 27, 28 and 29, 30 and 31 are detachably secured in their respective compartments by engagement with the rubber stops 40 by arms 41 that are pivoted on pins 42 and pressed inwardly against the outer plates by springs 43, see Figs. 1, 2 and 3. The arms 41 and springs 43 are omitted from the other figures of the drawings for the sake of clearness; it being understood that the plates can be detachably secured in any well known way. The pins 42 are detachably secured in slots 142 arranged in the forwardly extending flanges of the vertical T-irons 14 and 15, see Fig. 3.

The rubber stops 40 are preferably secured to the flanges of the T-irons 14, 15, 20, 21 and 22 so that at least three of them engage all the edges of the back plate 28, as best shown in Figs. 3 and 4.

The front plates 23, 26 and 29 are preferably glass or clearly transparent material so that the picture and advertising features on the intermediate semi-transparent sheets or plates 24, 27 and 28 are distinctly visible through them. Preferably the back plates 25, 28 and 31 are formed of semitransparent white porcelain so they aid the intermediate plates in diffusing the light from the lamps 35, it being understood that the intermediate plates can be made of paper or any suitable semitransparent material. Also it is understood that the pictorial features can be placed on them and the advertising subject matter printed or painted on the rear faces of the front plates or that both the advertising and picture features can be placed on the intermediate plates.

From the drawings it is obvious that the picture plates are interchangeable horizontally to make a large number of panoramic pictures to hold the attention of the observers.

In Fig. 5 I illustrate how the colored lamps 35 are arranged to illuminate the panoramic picture in Fig. 1 and show it in the natural colors of a yellow sunset. The lamps in their various tones of blue, green, yellow and red are arranged to blend into the natural colors of a picture such as shown in Fig. 1, and these blended colored lights when diffused through the white porcelain back plates and semi-transparent intermediate plates lend a highly pleasing and artistic effect to the pictorial advertising.

It is obvious that other colored lamps of various shades and tones can be used when necessary to enhance the pictorial advertising. Also it is understood that these lamps can be flashed intermittently, all together, or in a series to light part or all of the picture, or lighted in succession to illuminate each plate separately.

In Figs. 6, 7 and 8 I illustrate how the apparatus can be used to display an advertising story in a serial. The serial can consist of a large number of features shown on separate plates, or sets of plates, and displayed successively from time to time. In illustrating this feature of the invention I use the fictitious name of the A. B. Sky-High Co., assumed to be manufacturers of airplanes, and in the No. 1 plate in Fig. 6 I show an airplane flying skyward with no land or sea visible.

In the next pictorial advertising of this company shown in Fig. 7 I have two airplanes rising upward over a mountain and with the advertising slightly changed to disclose another feature of this company. In Fig. 8, or third number of the series, I show an airplane coming shoreward from the sea with the advertising disclosing still another favorable feature of this invention. It is obvious that this serial can be continued indefinitely, but for the sake of brevity only three pictorial advertising plates of the series are shown.

As previously stated, the plates of the series can be changed from time to time, which may be by the day or week, or as often as may appear to be necessary, to hold the attention of the observers, or moved from bill-board to bill-board and place to place.

Also, as previously indicated, the attention of the public is held to the display by means of the interchangeable pictorial plates of the apparatus, which may be changed and interchanged daily to show entirely new panoramic pictures, which, when illuminated in natural colors, will be continuously interesting and pleasing to the observers and hold the attention to the advertising.

In use the apparatus is provided with interchangeable pictorial advertising plates and illuminated as described and the plates changed and interchanged from time to time, so as to please and hold the attention of the public.

The bill-board can be formed of any suitable size, and when made small for window and counter display in stores is preferably erected and supported on caster wheels, as shown in Fig. 16, so it can be easily moved around, as for a better lighting or display of its front side.

I claim as my invention:

1. An apparatus for displaying advertising including a frame in the form of a bill-board having compartments in the front thereof, superposed plates in sets of three each including a back light diffusing plate, an intermediate picture plate and a front transparent plate with each picture plate forming an interchangeable part of a panoramic advertising picture, each set of plates adapted to be removably fitted into any of the compartments and interchangeable with other sets so that an advertising story in a serial can be displayed in series by the substitution of one set of plates for another set of the serial, and means for detachably securing the sets of plates in the compartments of said frame.

2. An apparatus for displaying pictorial advertising including a base, vertical T-irons spaced apart and having their lower ends secured to said base, horizontal T-irons secured to said vertical T-irons so as to form a plurality of compartments between them, plates arranged in said compartments and having pictorial features thereon over which advertising can be displayed, spring means for detachably holding said plates in said compartments, and a colored lamp arranged rearward of each compartment for the purpose specified.

3. An apparatus for displaying pictorial advertising including a base, vertical T-irons spaced an equal distance apart and having their lower ends secured to said base, horizontal T-irons removably secured to said vertical T-irons arranged to form compartments between them, plates in groups of three arranged in said compartments, spring-pressed arms for detachably holding said plates in their respective compartments, and lamps back of each of said compartments to illuminate said plates for the purpose specified.

4. An apparatus for displaying pictorial advertising including a base, vertical T-irons spaced an equal distance apart and having their lower ends secured to said base, horizontal T-irons detachably secured to said vertical T-irons to form compartments between them, rubber stops secured to said T-irons, semi-transparent plates arranged in said compartments against said rubber stops, semi-transparent pictorial plates engaging said semi-transparent plates, transparent plates arranged on said pictorial plates, spring pressed arms for engaging said transparent plates and holding them in the compartments, and lamps for illuminating said plates to display the pictorial advertising thereon.

5. An apparatus for displaying pictorial advertising including a base, vertical T-irons spaced an equal distance apart and having their lower ends secured to said base, horizontal T-irons detachably secured to said vertical T-irons to form compartments between them, rubber stops secured to said T-irons, white porcelain plates arranged in said compartments against said stops, semi-transparent advertising picture plates arranged on said porcelain plates, transparent plates arranged over said advertising picture plates, spring pressed arms for holding said plates in their respective compartments, and a colored lamp back of each compartment adapted to show in natural colors the pictorial features on each pictorial advertising plate.

6. An apparatus for displaying advertising including a frame having vertical and horizontal T-irons arranged to form rectangular compartments between them, pictorial advertising plates arranged in said compartments, and spring-pressed arms detachably secured in the vertical T-irons for detachably securing said plates in said compartment.

7. An apparatus for displaying pictorial advertising including a bill-board having a plurality of T-irons adjustably secured together to form rectangular compartments in the face thereof, plates having pictorial advertising thereon fitted in said compartments, and spring-pressed arms detachably secured to said T-irons for detachably holding said plates in said compartments.

8. An apparatus for displaying pictorial advertising including a base, T-irons spaced an equal distance apart and having their lower ends secured to said base so they are supported vertically, other T-irons removably secured to said vertical T-irons arranged to form rectangular compartments between them with the flanges of said irons forming back stops to said compartments, plates fitted into said compartments with their marginal edge portions engaging stops on said flanges, and spring pressed arms detachably secured to said vertical T-irons for detachably holding said plates in said compartments.

In witness whereof, I have hereunto affixed my signature.

GUSTAVUS W. ESCHENBACH.